June 25, 1940.   A. HALLBERG   2,205,761
BEVERAGE DISPENSING DEVICE
Filed Dec. 9, 1938    2 Sheets-Sheet 1
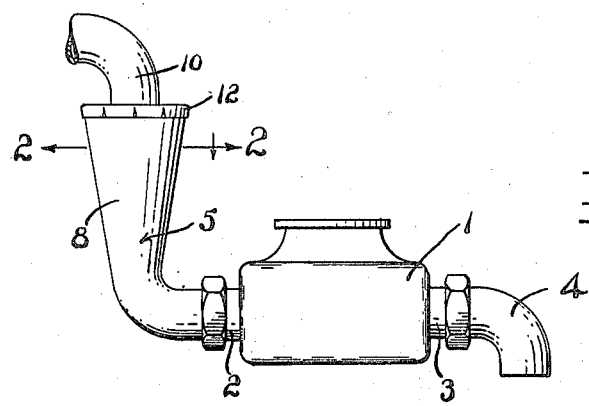
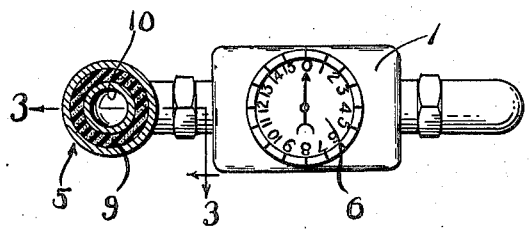
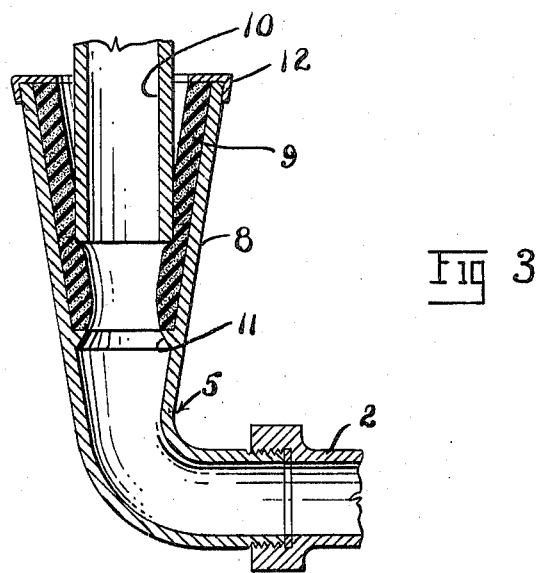
Andrew Hallberg
INVENTOR
BY
ATTORNEY

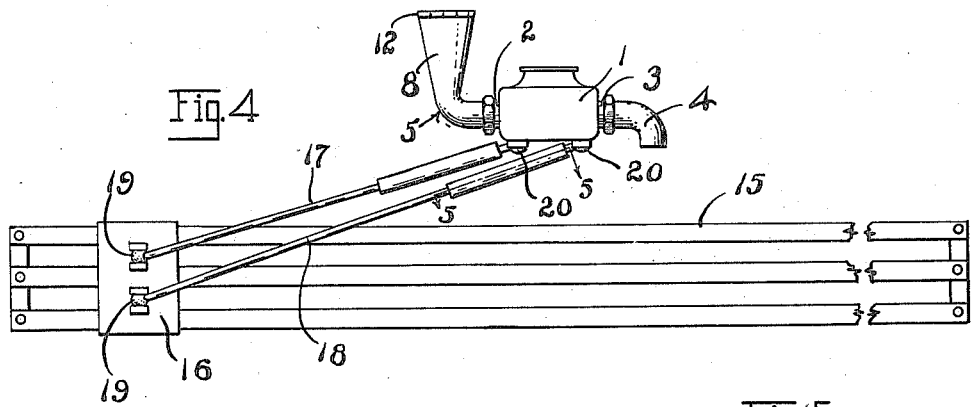
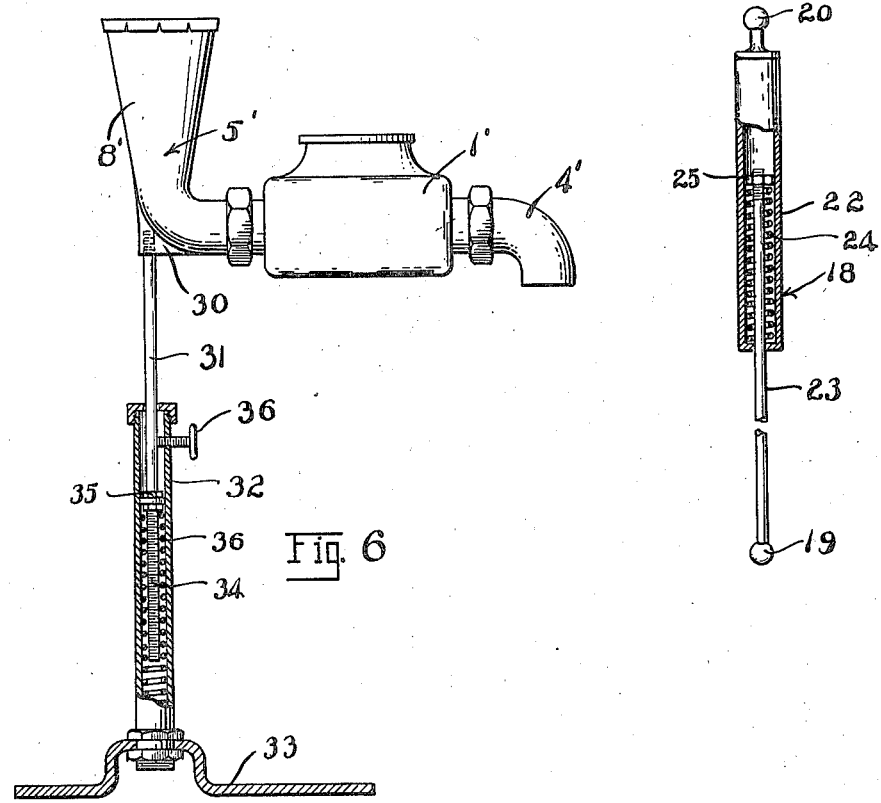

Patented June 25, 1940

2,205,761

UNITED STATES PATENT OFFICE 2,205,761

BEVERAGE DISPENSING DEVICE

Andrew Hallberg, West New York, N. J.

Application December 9, 1938, Serial No. 244,763

5 Claims. (Cl. 225—5)

This invention relates to measuring devices and more particularly to a measuring unit including a meter and attaching structure for measuring beer or other beverages as they are dispensed.

Various beverages, and particularly beer and/or ale, are sold at retail, in bulk, for off-the-premises consumption. In the present method in use no accurate measurement of the quantity of beverage dispensed is provided, and the dispenser or bar tender uses his own discretion as to the quantity of beverage of each sale and its price.

This method is unsatisfactory in many respects for both the purchaser and the seller, in that there is no degree of accuracy in the measuring and the price charged for the various sales. Also there is no uniformity in the sales, and the purchaser does not know accurately what quantity of beverage he is obtaining for his money, while the seller has no definite knowledge of whether he is selling at a profit or loss, due primarily to the inaccuracy of measurement of the beverage.

An object of the present invention is to provide a measuring device, including a measuring unit, such as a meter or the like, together with an attaching structure whereby the measuring unit may be quickly, easily, and conveniently attached to the beverage dispensing faucet for accurately measuring the beverage as it is dispensed into a bucket, pitcher, or other container, and which may be quickly detached from the faucet when dispensing the beverage for consumption on the premises.

With these and other objects in view, as may appear from the accompanying specification, the invention consists of various features of construction and combination of parts, which will be first described in connection with the accompanying drawings, showing a beer measuring device of the preferred form embodying the invention, and the features forming the invention.

In the drawings:

Figure 1 is a side elevation of the improved measuring unit.

Figure 2 is a horizontal section partly in top plan of the measuring unit.

Figure 3 is a fragmentary vertical section through the measuring unit.

Figure 4 is a side elevation of the measuring unit showing it attached to one form of a supporting structure.

Figure 5 is a detail view of the supporting structure partly in section on the line 5—5 of Figure 4.

Figure 6 is a side elevation of a modified form of the supporting structure showing the latter in vertical section.

Referring more particularly to the drawings, they indicate a beverage or liquid measuring meter of any approved construction which may be purchased on the open market. Beverage or liquid measuring meters of this type have attaching nipples 2 and 3 thereon at the inlet and outlet respectively of the meter through which the liquid measured flows. In the present invention a dispensing spout 4 is connected to the outlet nipple 3, while an inlet conduit 5 is connected to the nipple 2.

The inlet nipple 5 is bent, as clearly shown in Figure 1, so that the meter, which will be supported in a horizontal position with its recording dial 6 facing upwardly, enabling it to be more clearly seen by the person using the device. The vertical portion 8 of the inlet conduit 5 tapers inwardly, downwardly from its inlet to the beer conduit, thus gradually decreasing in diameter from its inlet end progressively to the bend, as clearly shown in Figures 1 and 3 of the drawings. A resilient sleeve 9 is mounted in the tapered portion 8 of the inlet conduit 5, and this sleeve is preferably formed of rubber or analogous material, so that it will partially grip a part of the spout of a faucet 10, such as is used for the dispensing of the beer, ale, or other beverage. The inlet conduit 5 is tapered as above specified and the inner bore of the resilient sleeve 9 tapers correspondingly, because of the lack of uniformity in the sizes of faucets, and to allow a tight supporting connection to be had between the measuring unit and the faucet 10, regardless of the size of the faucet.

If it is so desired, an annular shoulder 11 may be formed in the tapered portion 8 of the conduit 5, forming an abutment and limiting the inward movement of the resilient sleeve 9. The inlet end of the tapered portion 8 is open so that the resilient sleeve may be removed for replacement when necessary. A removable cover 12 is detachably mounted upon the inlet end of the conduit 5 for preventing the resilient sleeve from moving out of the tapered portion 8 when the measuring unit is disconnected from the faucet.

The complete measuring unit comprising the meter 1, spout 4, and inlet conduit 5 is relatively small, and when it is desired to dispense beverage for consumption off the premises the person dispensing the beverage may grip the meter in his hand and with an upward movement force the resilient sleeve 9 over the faucet 10, so that the beverage, as it is dispensed, will flow through the inlet conduit 5, meter 1, and out through the spout 4, be accurately measured, and thereby permit both the seller and the buyer to know exactly how much beverage is dispensed to the container. The measuring unit may be easily removed from the faucet 10 when it is desired to dispense the beverage in glasses for consumption on the premises.

In Figures 4 and 5 of the drawings a supporting structure for the measuring unit is provided by means of which the measuring unit may be supported on a bar so as to always be at hand when needed, and so that it may be moved along the bar for connection with any one of a number of faucets.

The supporting structure comprises a rack 15, which is attached to a bar (not shown) or other suitable support, and has a carrier 16 slidably mounted thereon. A pair of extensible rods 17 and 18 are connected to the carrier 16 by ball and socket joints 19, and to the measuring unit by other ball and socket joints 20, providing a universal connection between the measuring unit and the rack 15. The longitudinal extensible rods or bars 17 and 18 are composed of sections 22 and 23, the former of which is in the form of a cylinder, while the latter telescopes therein, as clearly shown in Figure 5 of the drawings. A spring 24 is mounted in the cylindrical member 22 and engages a head or nut 25 on the rod or member 23 for collapsing the extensible rods or bars 17 and 18 at all times except when pressure is applied to the measuring unit for extending the length of the rods to permit connection of the measuring unit with a faucet.

In Figure 6 of the drawings a modified form of both the support and the measuring unit are shown. This modified form is the same as the preferred form of the measuring unit shown in Figures 1 to 4 inclusive, including meter 1', spout 4', and inlet connection 5', but differing therefrom only in that the inlet connection 5' has a connecting abutment 30 formed thereon.

A rod 31 is detachably connected to the connecting abutment 30 and telescopes into a sleeve 32 carried by a suitable supporting base 33. A portion of the rod 31 within the sleeve 32 is threaded as shown at 34, and a nut 35 is adjustably mounted thereon. A spring 36 is positioned within the sleeve 32 and engages the nut 35 for urging the rod 31, and consequently the measuring unit, upwardly. By positioning the rod 31 directly under the tapered portion 8' of the inlet connection 5', the pressure of the spring will be exerted in almost a straight line to force the inlet connection over a faucet. A thumb screw 36 may be carried by the sleeve 32 and threaded to engage with the rod 31 to hold the rod and the measuring unit 1 in adjusted positions with respect to the sleeve 32 and the base 33. When it is desired to disconnect the measuring unit from a faucet, the thumb screw 36 is released and the measuring unit is pressed downwardly off the faucet, compressing the spring 36, and it is then removed out of the way.

It will be understood that the invention is not to be limited to the specific construction or arrangement of parts shown but that they may be widely modified within the invention defined by the claims.

What is claimed is:

1. In a beverage measuring device, a measuring unit comprising in combination a meter, a dispensing spout attached to the outlet of the meter, and an inlet conduit connected to the inlet of the meter, means carried by the inlet conduit for detachably engaging with a dispensing faucet, and an extensible supporting device connected to said measuring unit for supporting the measuring unit independently of a dispensing faucet.

2. In a beverage measuring device, a measuring unit comprising in combination a meter, a dispensing spout attached to the outlet of the meter, an inlet conduit connected to the inlet of the meter, said inlet conduit having its inlet end flared to provide a tapered portion decreasing in diameter progressively inwardly from the inlet end, a resilient sleeve in said tapered portion for receiving and frictionally gripping a part of a beverage dispensing faucet, and a support for said measuring unit including a carrying frame, a member slidable along said carrying frame, and extensible supporting rods connecting said measuring unit and said slidable member by universal joints.

3. In a beverage measuring device, the combination with a dispensing faucet, of a measuring meter, a dispensing spout attached to the outlet of the meter, an inlet conduit detachably connected to the inlet of the meter, a resilient member carried by said inlet conduit for frictionally engaging a beverage dispensing faucet to detachably connect the meter to a faucet, and an extensible supporting device connected to said measuring unit for supporting the measuring unit independently of the faucet.

4. In a beverage measuring device, the combination, of a measuring meter, a dispensing spout attached to the outlet of the meter, an inlet conduit detachably connected to the inlet of the meter, a resilient member carried by said inlet conduit for frictionally engaging a beverage dispensing faucet to detachably connect the meter to the faucet, and an extensible supporting device connected to said measuring unit, said extensible supporting device including a carrying frame, a member slidable along said carrying frame, and extensible supporting rods connected to said measuring unit and said slidable member by ball and socket joints.

5. A beverage measuring device comprising a measuring meter having an inlet connection and an outlet connection, a dispensing spout detachably connected to the meter outlet, and an attaching inlet nipple embodying means for detachably gripping a dispensing faucet attached to the inlet connection of the meter, thereby forming a beverage measuring device adaptable for use with a selected one of a plurality of dispensing faucets.

ANDREW HALLBERG.